US008964112B2

(12) United States Patent
Nakamura

(10) Patent No.: US 8,964,112 B2
(45) Date of Patent: Feb. 24, 2015

(54) INTERCHANGEABLE LENS, IMAGING APPARATUS, IMAGING SYSTEM, METHOD FOR CONTROLLING INTERCHANGEABLE LENS, AND PROGRAM

(75) Inventor: Makibi Nakamura, Tokyo (JP)

(73) Assignee: Sony Corporation, Tokyo (JP)

(*) Notice: Subject to any disclaimer, the term of this patent is extended or adjusted under 35 U.S.C. 154(b) by 938 days.

(21) Appl. No.: 13/082,755

(22) Filed: Apr. 8, 2011

(65) Prior Publication Data
US 2011/0292270 A1 Dec. 1, 2011

(30) Foreign Application Priority Data
May 28, 2010 (JP) ................................. 2010-122233

(51) Int. Cl.
H04N 5/225 (2006.01)
G02B 13/16 (2006.01)
G03B 17/14 (2006.01)
G03B 7/20 (2006.01)
H04N 5/232 (2006.01)

(52) U.S. Cl.
CPC *G03B 17/14* (2013.01); *G03B 7/20* (2013.01); *H04N 5/23209* (2013.01); *H04N 5/23212* (2013.01); *H04N 5/23245* (2013.01); *H04N 5/23248* (2013.01); *G03B 2205/00* (2013.01); *G03B 2217/007* (2013.01)
USPC .......................................... 348/372; 348/335

(58) Field of Classification Search
USPC ................. 348/208.4, 272, 333.99, 335, 345, 348/373–376, 372
See application file for complete search history.

(56) References Cited

U.S. PATENT DOCUMENTS

| 5,557,365 | A  | * | 9/1996  | Ohsawa .......................... 396/279  |
| 5,672,862 | A  | * | 9/1997  | Ohara et al. .................. 250/204    |
| 5,794,081 | A  | * | 8/1998  | Itoh et al. ......................... 396/55 |
| 5,845,158 | A  | * | 12/1998 | Ogawa et al. ................... 396/55    |
| 6,031,999 | A  | * | 2/2000  | Ogawa .......................... 396/303   |
| 6,041,189 | A  | * | 3/2000  | Izukawa ........................ 396/277   |
| 8,040,381 | B2 | * | 10/2011 | Yumiki et al. ............. 348/208.5      |
| 8,271,054 | B2 | * | 9/2012  | Bockus et al. ................ 455/573     |
| 2009/0284643 | A1 | * | 11/2009 | Shibuno et al. ............. 348/347     |
| 2013/0050550 | A1 | * | 2/2013  | Shintani et al. ............. 348/294     |

FOREIGN PATENT DOCUMENTS

JP  2009-122287  6/2009

* cited by examiner

Primary Examiner — Roberto Velez
Assistant Examiner — Tuan Le
(74) Attorney, Agent, or Firm — Oblon, Spivak, McClelland, Maier & Neustadt, L.L.P.

(57) ABSTRACT

An interchangeable lens includes an acquiring section that acquires an amount of supply power from an imaging apparatus to which the interchangeable lens is attached, and operation information related to an operation of the imaging apparatus in a period during which the supply power is supplied, and a determining section that determines power to be distributed to a plurality of driving sections that drive a plurality of optical members, for each of the driving sections, on the basis of the acquired amount of supply power and the acquired operation information.

20 Claims, 8 Drawing Sheets

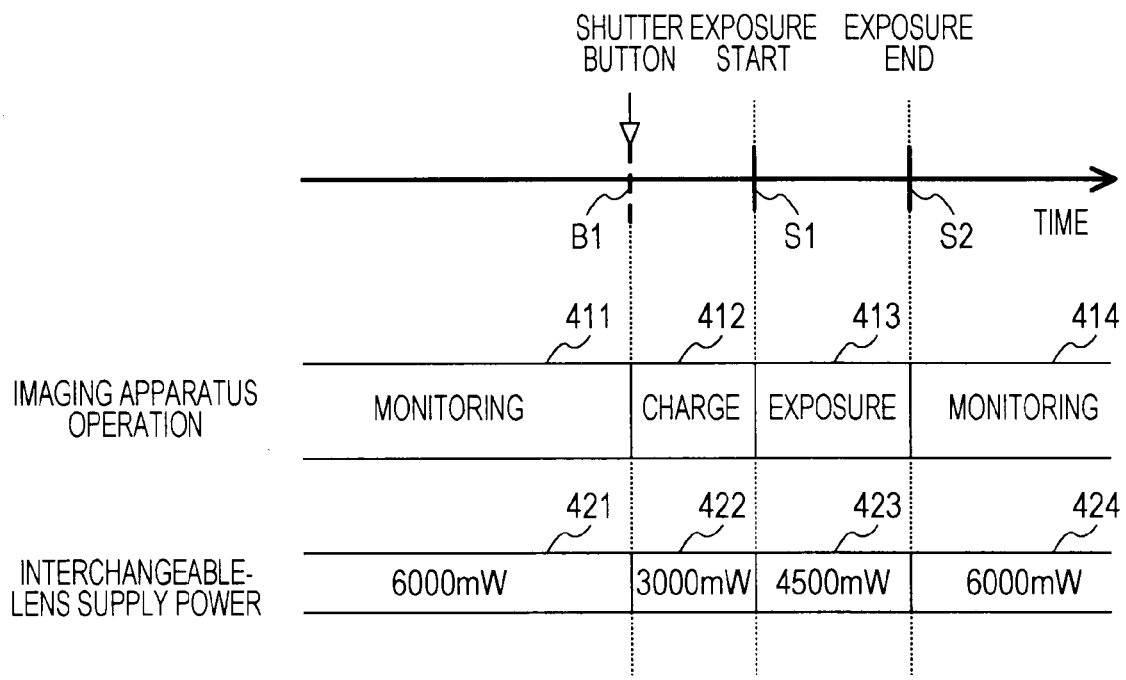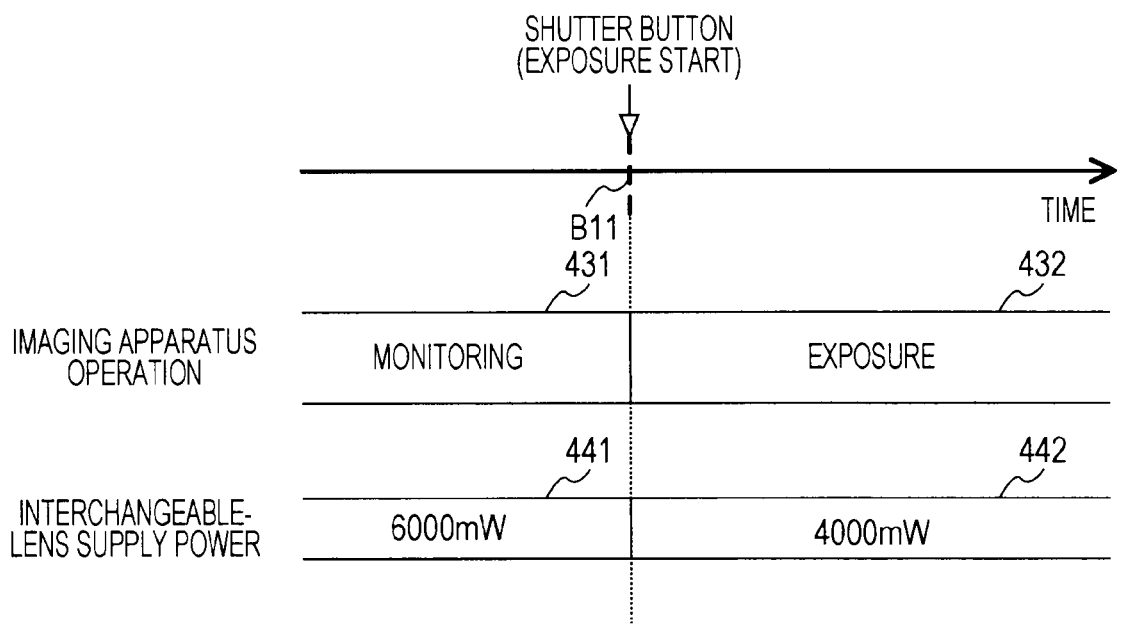

INTERCHANGEABLE LENS, IMAGING APPARATUS, IMAGING SYSTEM, METHOD FOR CONTROLLING INTERCHANGEABLE LENS, AND PROGRAM

BACKGROUND OF THE INVENTION

1. Field of the Invention

The present invention relates to an interchangeable lens, in particular, an interchangeable lens to which electric power is supplied from an imaging apparatus, an imaging apparatus, an imaging system, a method of controlling an interchangeable lens, and a program for causing a computer to execute the method.

2. Description of the Related Art

In recent years, there has been widespread use of imaging apparatuses such as digital still cameras which capture a subject such as a human to generate a captured image, and record this generated captured image. As such imaging apparatuses, imaging systems which allow the lens unit (interchangeable lens) to be changed in accordance with use (for example, single-lens reflex cameras) are in widespread use.

Such an interchangeable lens includes a plurality of driving sections (for example, actuators) for driving built-in optical members (such as a focus lens and a diaphragm). To do an imaging operation by using an imaging apparatus attached with such an interchangeable lens, it is sometimes necessary to supply large power from the imaging apparatus to the interchangeable lens to drive the plurality of driving sections.

On the other hand, on the side of the imaging apparatus attached with the interchangeable lens as well, its power consumption becomes relatively large depending on the kind of operation (operation mode) performed during an imaging operation. When relatively large power becomes necessary for the interchangeable lens while the imaging apparatus is executing an operation that consumes relatively large power, the power consumption sometimes exceeds the allowable value of power that can be supplied by the power source, making it not possible to perform appropriate power supply. Such situations where relatively large power becomes necessary for both the interchangeable lens and the imaging apparatus occur when, for example, the interchangeable lens executes an initialization process.

Accordingly, as an imaging apparatus designed to perform appropriate power supply, for example, there has been proposed an imaging apparatus which holds down the peak value of power consumption in the initialization process of the interchangeable lens so that the power consumption does not exceed a predetermined value (see, for example, Japanese Unexamined Patent Application Publication No. 2009-122287 (FIG. 1)).

SUMMARY OF THE INVENTION

In the imaging apparatus mentioned above, on condition that the processing in question is not prohibited from being stopped, an initialization process is started, and processing that consumes power exceeding a predetermined value is prohibited until the initialization process is completed, thereby holding down the peak value of power consumption of the imaging apparatus.

However, such an imaging apparatus is not able to perform appropriate power supply in situations where, other than during the initialization process, relatively large power becomes necessary for both the interchangeable lens and the imaging apparatus (for example, during image capture).

It is desirable to distribute power from the imaging apparatus appropriately to driving sections.

According to an embodiment of the present invention, there are provided an interchangeable lens, its control method, and a program for causing a computer to execute the method. The interchangeable lens includes an acquiring section that acquires an amount of supply power from an imaging apparatus to which the interchangeable lens is attached, and operation information related to an operation of the imaging apparatus in a period during which the supply power is supplied, and a determining section that determines power to be distributed to a plurality of driving sections that drive a plurality of optical members, for each of the driving sections, on the basis of the acquired amount of supply power and the acquired operation information. This brings about such an effect that the power to be distributed to a plurality of driving sections that drive a plurality of optical members is determined on the basis of the amount of supply power and the operation information.

In the embodiment mentioned above, when the optical members are to be driven, the determining section may determine power to be distributed to each of the driving sections that drives each of the optical members. This brings about such an effect that the power to be distributed to each of the driving sections that drives each of the optical members is determined.

In the embodiment mentioned above, the interchangeable lens may further include a holding section that holds power distribution information in association with the operation information, the power distribution information indicating a relationship between the amount of supply power and power used by each of the driving sections, and the determining section may acquire the power distribution information corresponding to the operation information from the holding section, and determine the power to be distributed, on the basis of the acquired power distribution information and the amount of supply power. This brings about such an effect that the power to be distributed is determined on the basis of power distribution information corresponding to operation information and the amount of supply power.

In the embodiment mentioned above, each of the optical members may include a focus lens and a correction lens for correcting camera shake, and each of the driving sections may include a first driving section that drives the focus lens, and a second driving section that drives the correction lens. This brings about such an effect that the power to be distributed to each of the first driving section that drives the focus lens, and the second driving section that drives the correction lens for correcting camera shake is determined. Also, in this case, the determining section may give the first driving section a higher priority in distribution of power than the second driving section, when the operation of the imaging apparatus specified by the acquired operation information is a monitoring operation. This brings about such an effect that when the operation of the imaging apparatus is a monitoring operation, the first driving section is given a higher priority in distribution of power than the second driving section. Also, in this case, each of the optical members may further include a diaphragm, each of the driving sections may further include a third driving section that drives the diaphragm, and the determining section may give the third driving section a lower priority in distribution of power than the second driving section, when the operation of the imaging apparatus specified by the acquired operation information is a monitoring operation. This brings about such an effect that when the operation of the imaging apparatus is a monitoring operation, the third driving section is given a lower priority in distribution of power than the second driving section. Also, in this case, the determining section may give the second driving section a lower priority in distribution of power than the first driving section, when the operation of the imaging apparatus specified by the acquired operation information is an operation in a period from when a shutter button is depressed to when exposure starts. This brings about such an effect that when the operation of the imaging apparatus specified by the acquired operation information is an operation in a period from when a shutter button is depressed to when exposure starts, the second driving section is given a lower priority in distribution of power than the first driving section. Also, in this case, the determining section may give the second driving section a higher priority in distribution of power than the first driving section, when the operation of the imaging apparatus specified by the acquired operation information is an exposure operation when capturing a still image. This brings about such an effect that when the operation of the imaging apparatus specified by the acquired operation information is an exposure operation when capturing a still image, the second driving section is given a higher priority in distribution of power than the first driving section. Also, in this case, the determining section may give the second driving section a higher priority in distribution of power than the first driving section, when the supply power is smaller than a predetermined amount of power. This brings about such an effect that when the supply power is smaller than a predetermined amount of power, the second driving section is given a higher priority in distribution of power than the first driving section.

According to an embodiment of the present invention, there are provided an interchangeable lens, its control method, and a program for causing a computer to execute the method. The interchangeable lens includes an acquiring section that acquires an amount of supply power from an imaging apparatus to which the interchangeable lens is attached, and a determining section that determines power to be distributed to a plurality of driving sections that drive a plurality of optical members, for each of the driving sections, on the basis of the acquired amount of supply power. This brings about such an effect that the power to be distributed to a plurality of driving sections that drive a plurality of optical members is determined for each of the driving sections, on the basis of the amount of supply power.

According to an embodiment of the present invention, there are provided an interchangeable lens, its control method, and a program for causing a computer to execute the method. The interchangeable lens includes an acquiring section that acquires operation information related to an operation of an imaging apparatus in a period during which supply power is supplied from the imaging apparatus to which the interchangeable lens is attached, and a determining section that determines power to be distributed to a plurality of driving sections that drive a plurality of optical members, for each of the driving sections, on the basis of the acquired operation information. This brings about such an effect that the power to be distributed to a plurality of driving sections that drive a plurality of optical members is determined for each of the driving sections, on the basis of the operation information.

According to an embodiment of the present invention, there are provided an imaging system, its control method, and a program for causing a computer to execute the method. The imaging system includes an imaging apparatus and an interchangeable lens. The imaging apparatus includes an operation information transmitting section that transmits operation information related to an operation of the imaging apparatus to the interchangeable lens being attached, and a supply power determining section that determines an amount of supply power supplied to the interchangeable lens, from power supplied from a power source and power consumption of the imaging apparatus. The interchangeable lens includes an acquiring section that acquires the supplied amount of supply power, and the transmitted operation information, and a determining section that determines power to be distributed to a plurality of driving sections that drive a plurality of optical members, for each of the driving sections, on the basis of the acquired amount of supply power and the acquired operation information. This brings about such an effect that the power to be distributed to a plurality of driving sections that drive a plurality of optical members in an interchangeable lens is determined in the interchangeable lens, on the basis of the amount of supply power supplied from the imaging apparatus to the interchangeable lens and the operation information.

According to an embodiment of the present invention, there are provided an imaging apparatus, its control method, and a program for causing a computer to execute the method. The imaging apparatus includes an operation information transmitting section that transmits operation information related to an operation of the imaging apparatus to an interchangeable lens being attached, and a supply power determining section that determines an amount of supply power supplied to the interchangeable lens, from power supplied from a power source and power consumption of the imaging apparatus. This brings about such an effect that operation information related to the operation of the imaging apparatus is supplied, and the amount of supply power is determined from the power supplied from a power source, and the power consumption of the imaging apparatus.

BRIEF DESCRIPTION OF THE DRAWINGS

FIGS. 2A and 2B are schematic diagrams each showing an example of control timings, an example of operations, and an example of variations in the power supplied to an interchangeable lens in the case when the imaging system captures a still image and a moving image according to an embodiment of the present invention;

DESCRIPTION OF THE PREFERRED EMBODIMENTS

Hereinbelow, modes for carrying out the present invention (hereinafter, referred to as embodiments) will be described.
[Example of Functional Configuration of Imaging System]

Figure 1:
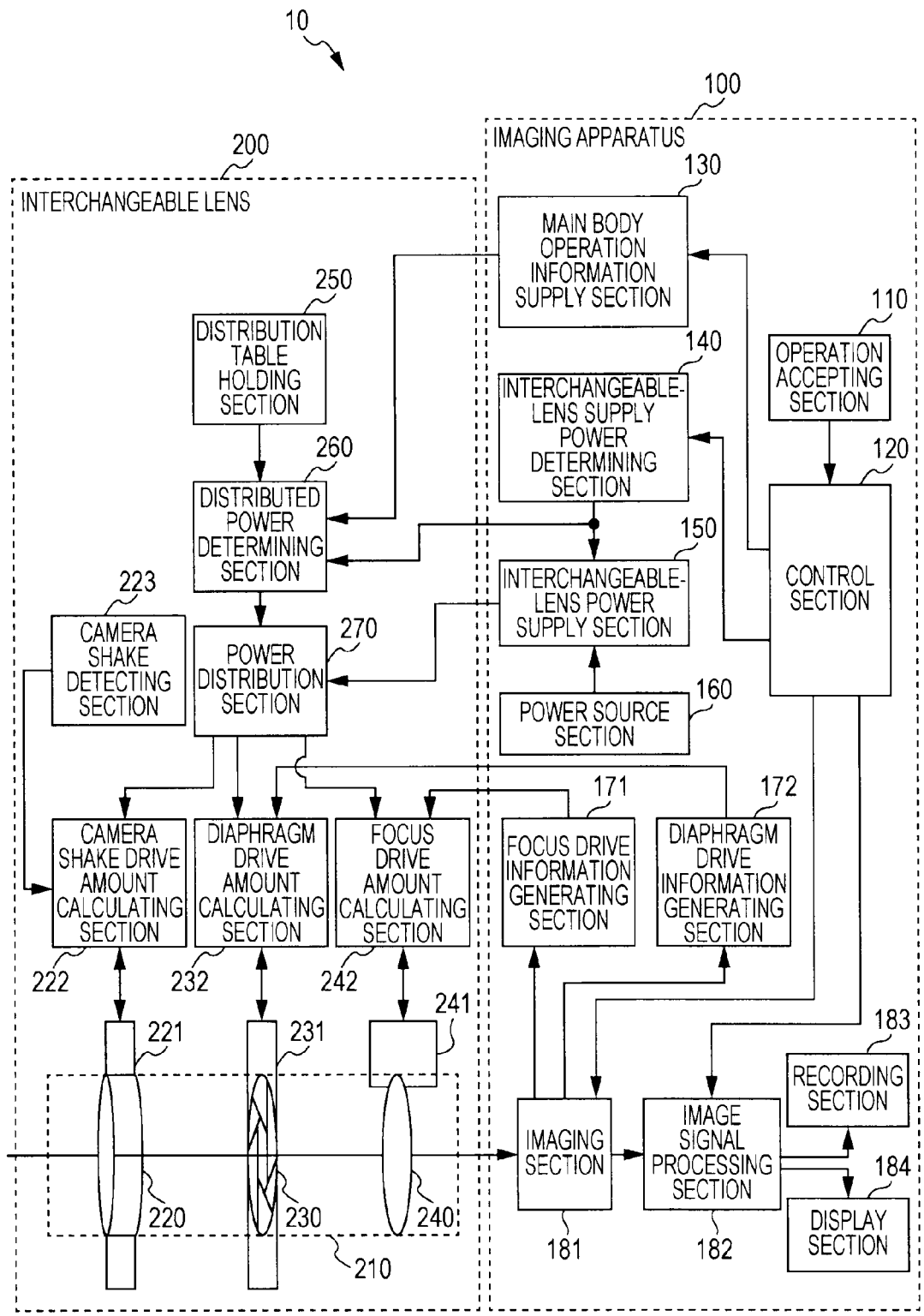
FIG. 1 is a block diagram showing an example of the functional configuration of an imaging system according to an embodiment of the present invention.

FIG. 1 is a block diagram showing an example of the functional configuration of an imaging system 10 according to an embodiment of the present invention. The imaging system 10 includes an imaging apparatus 100 and an interchangeable lens 200.

It should be noted that this embodiment of the present invention assumes, as the imaging system 10, a single-lens reflex camera whose lens (interchangeable lens 200) can be interchanged. It is supposed that the imaging apparatus 100 judges focus by the contrast method. It is also supposed that light metering for exposure control is done using an imaging device.

The interchangeable lens 200 includes a barrel 210, a camera shake correction lens 220, a diaphragm 230, a focus lens 240, a camera shake correction actuator 221, a diaphragm drive actuator 231, and a focus control actuator 241. The interchangeable lens 200 also includes a camera shake drive amount calculating section 222, a diaphragm drive amount calculating section 232, a focus drive amount calculating section 242, a camera shake detecting section 223, a distribution table holding section 250, a distributed power determining section 260, and a power distribution section 270.

The barrel 210 is a part where a lens group, a diaphragm, and the like which optically control light incident on an imaging section 181 are equipped. For the convenience of description, the camera shake correction lens 220, the diaphragm 230, and the focus lens 240 are shown in the portion of the barrel 210.

The camera shake correction lens 220 is a lens that is driven when correcting camera shake.

The camera shake correction actuator 221 is an actuator for driving the camera shake correction lens 220. The camera shake correction actuator 221 drives the camera shake correction lens 220 by using electric power supplied from the camera shake drive amount calculating section 222. It should be noted that in an embodiment of the present invention, it is assumed that when there is no power to be supplied (0 mW), the camera shake correction actuator 221 is not able to hold the center position of the camera shake correction lens 220 (the position in which the center of the camera shake correction lens 220 and the optical axis are aligned with each other). That is, it is assumed that when there is no power to be supplied (0 mW), the interchangeable lens 200 is dropped with gravity to the lowest point within its movable range.

The camera shake detecting section 223 detects camera shake. The camera shake detecting section 223 is implemented by, for example, a gyro sensor that detects the angular velocity produced when an object rotates. The camera shake detecting section 223 supplies information related to the detected camera shake (for example, angular velocity) to the camera shake drive amount calculating section 222 as camera shake information.

The camera shake drive amount calculating section 222 controls the driving force generated by the camera shake correction actuator 221, on the basis of power distributed from the power distribution section 270, and camera shake information supplied from the camera shake detecting section 223. The camera shake drive amount calculating section 222 calculates the direction and amount of movement of the camera shake correction lens 220, on the basis of the camera shake information and the current position of the camera shake correction lens 220. Then, with the power distributed from the power distribution section 270 as the maximum value (upper limit), the camera shake drive amount calculating section 222 supplies power to the camera shake correction actuator 221 so as to generate a driving force according to the calculated amount of movement.

For example, assume a case in which even though the same amount of power as the maximum power consumption of the camera shake correction actuator 221 is supplied from the power distribution section 270, there is no camera shake (for example, due to fixation to a tripod). In this case, out of the distributed power, the camera shake drive amount calculating section 222 supplies only an amount of power that can maintain the center position of the camera shake correction lens 222 to the camera shake correction actuator 221.

Further, assume a case in which the same amount of power as the maximum power consumption of the camera shake correction actuator 221 is supplied from the power distribution section 270, and small camera shake is occurring with low frequency (for example, camera shake that can be corrected with power equal to 10% of the maximum power consumption). In this case, camera shake drive amount calculating section 222 supplies only an amount of power that allows the camera shake to be corrected (power equal to 10% of the maximum power consumption), to the camera shake correction actuator 221.

The diaphragm 230 is a shielding object for regulating the amount of incident light entering the imaging apparatus 100 from a subject.

The diaphragm drive actuator 231 is an actuator for driving the diaphragm 230. The diaphragm drive actuator 231 controls the opening of the diaphragm 230 by using power supplied from the diaphragm drive amount calculating section 232. It should be noted that in an embodiment of the present invention, it is assumed that when there is no power to be supplied (0 mW), the diaphragm drive actuator 231 is not able to maintain the current opening of the diaphragm 230. That is, it is assumed that when vibration is applied to the interchangeable lens 200 in the state where there is no power to be supplied (0 mW), the opening of the diaphragm 230 changes due to the vibration.

The diaphragm drive amount calculating section 232 controls the driving force generated by the diaphragm drive actuator 231, on the basis of power distributed from the power distribution section 270, and diaphragm drive information supplied from the imaging apparatus 100. Here, the diaphragm drive information refers to information related to regulation of the amount of incident light (for example, the F-value). The diaphragm drive amount calculating section 232 calculates the amount of drive of the diaphragm 230 on the basis of the diaphragm drive information and the current opening of the diaphragm 230. Then, with the power distributed from the power distribution section 270 as the maximum value (upper limit), the diaphragm drive amount calculating section 232 supplies power to the diaphragm drive actuator 231 so as to generate a driving force according to the calculated drive amount.

For example, assume a case in which the same amount of power as the maximum power consumption of the diaphragm drive actuator 231 is supplied from the power distribution section 270, and diaphragm drive information indicating that the current amount of incident light is to be maintained is supplied. In this case, the diaphragm drive amount calculating section 232 supplies to the diaphragm drive actuator 231 an amount of power that can maintain the current opening of the diaphragm 230 (position holding power).

Further, assume a case in which the same amount of power as the maximum power consumption of the diaphragm drive actuator 231 is supplied from the power distribution section 270, and diaphragm drive information indicating that the amount of incident light is to be increased is supplied (for example, F 3.0 is supplied as the F-value to be set, as opposed to the current F-value of 5.0). In this case, the diaphragm drive amount calculating section 232 quickly causes the diaphragm to transition to a target opening by driving the diaphragm at the maximum speed with the maximum power consumption.

The focus lens 240 adjusts focus by moving inside the barrel 210 in the optical axis direction.

The focus control actuator 241 is an actuator for driving the focus lens 240. The focus control actuator 241 drives the focus lens 240 by using power supplied from the focus drive amount calculating section 242. It should be noted that in an embodiment of the present invention, it is assumed that when there is no power to be supplied (0 mW), the focus control actuator 241 is not able to maintain the current position of the focus lens 240. That is, it is assumed that when vibration is applied to the interchangeable lens 200 in the state where there is no power to be supplied (0 mW), the position of the focus lens 240 changes due to the vibration (the focus position is displaced).

The focus drive amount calculating section 242 controls the driving force generated by the focus control actuator 241, on the basis of power distributed from the power distribution section 270, and focus drive information supplied from the imaging apparatus 100. Here, the focus drive information refers to information related to movement of the focus lens 240 (for example, the amount of movement of focus). The focus drive amount calculating section 242 calculates the amount of movement of the focus lens 240 on the basis of the focus drive information and the current position of the focus lens 240. Then, with the power distributed from the power distribution section 270 as the maximum value (upper limit), the focus drive amount calculating section 242 supplies power to the focus control actuator 241 so as to generate a driving force according to the calculated amount of movement.

The distribution table holding section 250 holds information (power distribution table) for determining the distribution of power to individual actuators (driving sections) in the interchangeable lens 200. The distribution table holding section 250 supplies the held power distribution table to the distributed power determining section 260. It should be noted that the power distribution table held by the distribution table holding section 250 will be described later with reference to FIGS. 3 to 6. It should be noted that the distribution table holding section 250 is an example of the holding section described in the claims. Also, the power distribution table is an example of the power distribution information described in the claims.

The distributed power determining section 260 determines the distribution of power to the individual actuators in the interchangeable lens 200. On the basis of information supplied from the imaging apparatus 100 which indicates operation of the imaging apparatus 100 itself (operation mode information), the distributed power determining section 260 acquires a power distribution table corresponding to the operation from the distribution table holding section 250. Then, on the basis of the power distribution table, and information indicating the amount of power supplied to the interchangeable lens 200 (interchangeable-lens supply power information), the distributed power determining section 260 determines the amounts of power to be distributed to the individual actuators. That is, on the basis of the operation of the imaging apparatus 100 itself in a given period, and the amount of power supplied to the interchangeable lens 200 in the period, the distributed power determining section 260 determines the amounts of power distributed to the individual actuators in the period. Then, the distributed power determining section 260 supplies information indicating the determined amounts of power (distributed power information) to the power distribution section 270. It should be noted that the distributed power determining section 260 is an example of each of the acquiring section and the determining section described in the claims.

The power distribution section 270 distributes power. The power distribution section 270 distributes the power supplied from the imaging apparatus 100 to the individual actuators, on the basis of the distributed power information supplied from the distributed power determining section 260.

It should be noted that the individual actuators drive the corresponding lenses and diaphragm, with the driving force based on the power distributed from the power distribution section 270 as the maximum driving force. For example, in the case where 3000 mW is distributed to the focus control actuator 241, when the focus lens 240 is to be moved by a long distance, the focus lens is quickly driven by generating the maximum driving force that can be generated with this 3000 mW. In the case where the focus lens 240 is to be moved by only a slight distance, and high accuracy drive is necessary, the focus lens 240 is driven slowly with good accuracy using a part of the 3000 mW of power.

The imaging apparatus 100 includes an operation accepting section 110, a control section 120, a main body operation information supply section 130, an interchangeable-lens supply power determining section 140, and an interchangeable-lens power supply section 150. The imaging apparatus 100 also includes a power source section 160, a focus drive information generating section 171, a diaphragm drive information generating section 172, the imaging section 181, an image signal processing section 182, a recording section 183, and a display section 184.

The operation accepting section 110 accepts an operation from the user. When, for example, the shutter button is depressed, the operation accepting section 110 supplies a signal related to the depression to the control section 120 as an operation signal.

The control section 120 controls the operations of individual sections in the imaging apparatus 100. For example, on the basis of the signal related to depression of the shutter button, the control section 120 supplies a signal for starting image capture to each of the imaging section 181 and the image signal processing section 182. Also, the control section 120 analyzes the operating conditions of individual components in the imaging apparatus 100, and calculates the power necessary for operation of the imaging apparatus 100 itself, on the basis of the results of the analysis. Then, the control section 120 supplies information indicating the calculated power (necessary power information) to the interchangeable-lens supply power determining section 140. Also, the control section 120 supplies information indicating the analysis results of the operating conditions of the individual components in the imaging apparatus 100 (analysis result information), to the main body operation information supply section 130.

The main body operation information supply section 130 supplies information indicating the operating state of the imaging apparatus 100 (operation mode information). First, the main body operation information supply section 130 generates operation mode information on the basis of the analysis result information supplied from the control section 120. Then, the main body operation information supply section 130 supplies the generated operation mode information to the distributed power determining section 260. It should be noted that the main body operation information supply section 130 is an example of the operation information transmitting section described in the claims.

The interchangeable-lens supply power determining section 140 determines the power to be supplied from the imaging apparatus 100 to the interchangeable lens 200. The interchangeable-lens supply power determining section 140 determines the power that can be supplied to the interchangeable lens 200 by, for example, calculating the difference between the power that can be supplied by the power source section 160 (power source supply power), and the power indicated by the necessary power information. The interchangeable-lens supply power determining section 140 supplies information indicating the determined power (interchangeable-lens supply power information) to each of the interchangeable-lens power supply section 150 and the distributed power determining section 260. It should be noted that in an embodiment of the present invention, it is supposed that the main body operation information supply section 130 and the interchangeable-lens supply power determining section 140 perform generation and supply of the operation mode information and the interchangeable-lens supply power information, respectively, at an interval of 1/60 seconds (at a cycle of 1/60 seconds). That is, the interchangeable-lens supply power determining section 140 generates the interchangeable-lens supply power information by determining the power that can be supplied to the interchangeable lens 200 in the period during which the operation indicated by the operation mode information is performed. It should be noted that the interchangeable-lens supply power determining section 140 is an example of the supply power determining section described in the claims.

The interchangeable-lens power supply section 150 supplies power to the interchangeable lens 200. The interchangeable-lens power supply section 150 acquires, from the power source section 160, the amount of power indicated by the interchangeable-lens supply power information supplied from the interchangeable-lens supply power determining section 140, and supplies the acquired power to the power distribution section 270.

The power supply section 160 supplies the power for the imaging apparatus 10 to operate. The power supply section 160 is formed by, for example, a secondary battery such as a nickel hydrogen rechargeable battery.

The focus drive information generating section 171 generates focus drive information to align focus with an object to be captured. For example, in the case where focus is aligned by the contrast method, the focus drive information generating section 171 generates focus drive information indicating the amount of drive for executing the contrast method. The focus drive information generating section 171 supplies the generated focus drive information to the focus drive amount calculating section 242.

The diaphragm drive information generating section 172 generates diaphragm drive information for regulating the amount of incident light. For example, the diaphragm drive information generating section 172 calculates the optimal amount of light (for example, the F-value) for image capture, on the basis of the amount of incident light detected by the imaging section 181 before depression of the shutter button, and shutter speed that has been set. Then, the diaphragm drive information generating section 172 supplies information related to the calculated amount of light to the diaphragm drive amount calculating section 232 as diaphragm drive information.

The imaging section 181 generates an image signal by photoelectric conversion of incident light from a subject into an electrical signal. The imaging section 181 is implemented by, for example, inclusion of a complementary metal oxide semiconductor (CMOS) sensor or a charge coupled device (CCD) sensor as an image sensor (imaging device). The imaging section 181 starts the operation of capturing a subject and generating captured images, on the basis of an image capture start signal supplied from the control section 120. The imaging section 181 supplies the generated images (captured images) to the image signal processing section 182 on a per-image (frame) basis.

The image signal processing section 182 applies predetermined signal processing to the frame-wise image signals supplied from the imaging section, thereby generating image data to be held by the recording section 183, and image data to be displayed on the display section 184. The image signal processing section 182 supplies image data to be held by the recording section 183, out of the processed image signals. Also, the image signal processing section 182 supplies image data to be displayed on the display section 184 to the display section 184, out of the processed image signals.

The recording section 183 records the image data supplied from the image signal processing section 182. For example, the recording section 183 is implemented by a memory card.

The display section 184 displays an image. The display section 184 is implemented by, for example, a color liquid crystal panel. The display section 184 displays previously recorded images, a mode setting screen, and the like, other than images supplied from the image signal processing section 182.

[Example of Operation Mode of Imaging System]

FIGS. 2A and 2B are schematic diagrams each showing an example of control timings, an example of operations, and an example of variations in the power supplied to the interchangeable lens in the case when the imaging system 10 captures a still image and a moving image according to an embodiment of the present invention.

It should be noted that in FIGS. 2A and 2B, it is supposed that the maximum value of power that can be supplied to the interchangeable lens 200 by the imaging apparatus 100 is 6000 mW. Also, it is supposed that the imaging apparatus 100 can supply 6000 mW of power in the standby phase (monitoring operation) for image capture while displaying a live view (preview image of a subject's image being received by the imaging device) and performing auto focus and auto exposure.

In FIG. 2A, on a temporal axis, the timing (timing B1) at which the shutter button is depressed in the case of capturing a still image, and the timing (timing S1) at which exposure starts with movement of the front curtain of a focal plane shutter are shown. Also, on the same temporal axis, the timing (timing S2) at which exposure ends with movement of the rear curtain of the focal plane shutter is shown.

It should be noted that in FIG. 2A, a monitoring operation mode 411, a charge operation mode 412, an exposure operation mode 413, and a monitoring operation mode 414 are shown as operation modes corresponding to the control timings shown in FIG. 2A. Also, in FIG. 2A, the values of power supplied to the interchangeable lens 200 in the respective operation modes are shown in power values 421 to 424.

The monitoring operation mode 411 is a mode indicating a standby state (monitoring operation) for image capture until the timing at which the shutter button is depressed. When in this mode, the imaging apparatus 100 waits for a start instruction for image capture (depression of the shutter button) from the user while displaying a live view. In this state, coarse images are continuously generated for a live view in the imaging section 181, and thus only small power consumption is necessary for the imaging apparatus 100. In the power value 421, 6000 mW is shown as the power that is supplied to the interchangeable lens 200 by the imaging apparatus 100 when in this mode.

The charge operation mode 412 is a mode indicating the operation of the imaging apparatus 100 from the timing when the shutter button is depressed to the start of exposure. When in this mode, the imaging apparatus 100 is charging power to the actuator that drives the focal shutter plane (charge operation). When in this mode, the imaging apparatus 100 charges power to the actuator that moves the focal shutter plane in a short time, and thus the amount of power that can be supplied to the interchangeable lens 200 decreases significantly. In the power value 422, 3000 mW is shown as the power that is supplied to the interchangeable lens 200 by the imaging apparatus 100 when in this mode.

The exposure operation 413 is a mode indicating the operation of the imaging apparatus 100 from the start of exposure to the end of exposure. When in this mode, the imaging apparatus 100 is doing exposure by receiving incident light from a subject by the entire surface of the imaging device in the imaging section 181 (exposure operation). When in this state, the imaging apparatus 100 is generating high definition images for image capture, and thus the power necessary for the imaging apparatus 100 itself becomes larger than that when in the monitoring mode. In the power value 423, as the power that is supplied to the interchangeable lens 200 by the imaging apparatus 100 when in this mode, 4500 mW of power smaller than that when in the monitoring mode but larger than that when in the charge mode is shown.

The monitoring operation mode 414 is a mode indicating the operation of the main body after the end of exposure. The monitoring operation mode 414 is a mode indicating the operation of the imaging apparatus 100 when on standby for the next image capture. Since the monitoring operation mode 414 is the same as the monitoring mode 411, description thereof is omitted here.

In FIG. 2B, on a temporal axis, the timing (timing B11) at which capturing of a moving image starts with depression of the shutter button in the case of capturing a moving image is shown on a temporal axis. Also, in FIG. 2B, operation modes 431 and 432 corresponding to the control timing shown in FIG. 2B, and power values 441 and 442 corresponding to the operation modes are shown. It is illustrated here that in the case of capturing a moving image as well, the value of power supplied to the interchangeable lens 200 varies in accordance with the operation of the imaging apparatus 100.

In this way, in the imaging system 10, power supplied to the interchangeable lens 200 varies in accordance with the operation of the imaging apparatus 100. Also, as the information related to the operation of the imaging apparatus 100 shown in FIGS. 2A and 2B is supplied to the interchangeable lens 200 from the main body operation information supply section 130, the interchangeable lens 200 can detect the operation mode of the imaging apparatus 100.

It should be noted that while FIGS. 2A and 2B depict the value of supply power supplied to the interchangeable lens 200 in each operation mode as being a single value, this should not be construed restrictively. The power supplied by the power source section 160 can be efficiently used by making the supply power vary in accordance with the operation of the imaging apparatus 100 in each operation mode.

[Example of Power Distribution Table Used During Monitoring Operation]

Figure 3:
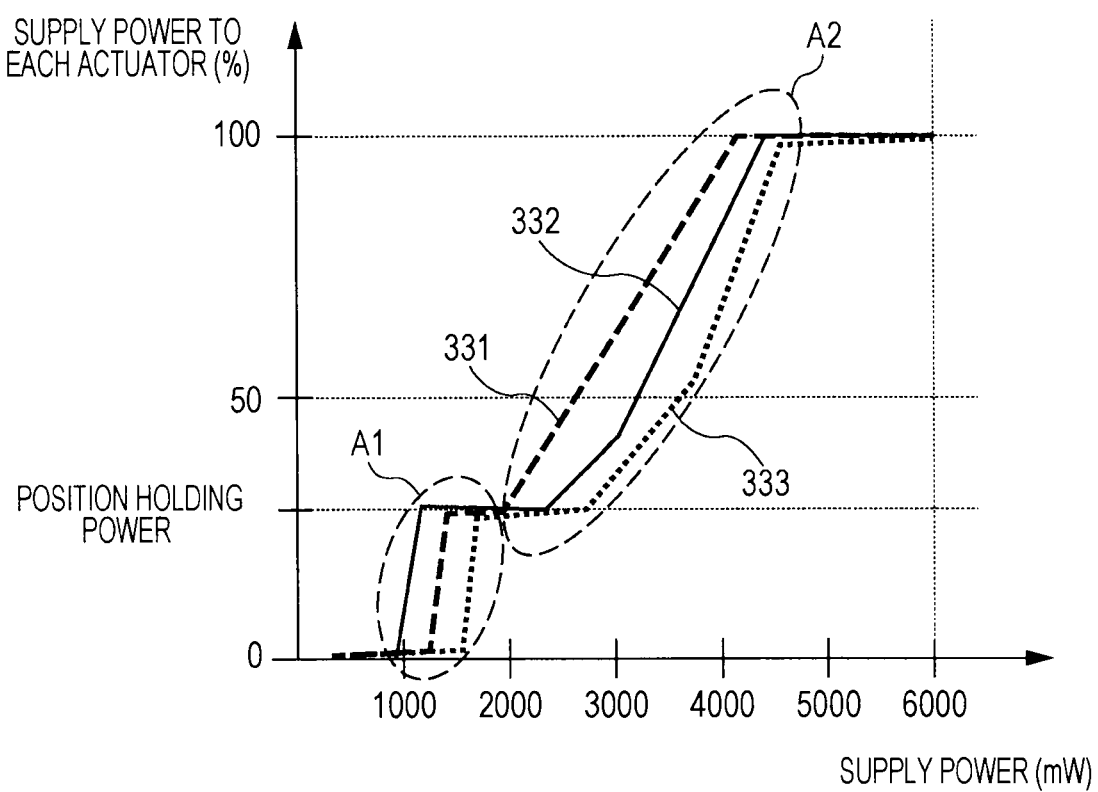
FIG. 3 is a graph showing an example of a power distribution table used during a monitoring operation which is held by a distribution table holding section according to an embodiment of the present invention.

FIG. 3 is a graph showing an example of a power distribution table used during the monitoring operation which is held by the distribution table holding section 250 according to an embodiment of the present invention.

FIG. 3 shows power characteristics indicating the powers distributed to individual actuators during the monitoring operation (see FIGS. 2A and 2B), with the horizontal axis taken as an axis indicating the power supplied to the interchangeable lens 200 (interchangeable-lens supply power), and the vertical axis taken as an axis indicating the powers distributed to the individual actuators. FIG. 3 shows a focus drive power characteristic 331, a camera shake correction drive power characteristic 332, and a diaphragm drive power characteristic 333 as the power characteristics indicating the powers distributed to the individual actuators. It should be noted that in FIG. 3, the unit of the vertical axis is represented by a ratio (%) to the maximum consumption of power distributed to each individual actuator.

The focus drive power characteristic 331 is a characteristic indicating the power distributed to the focus control actuator 241 during the monitoring operation. In accordance with the focus drive power characteristic 331, when the interchangeable-lens supply power is smaller than about 1300 mW, no power is distributed to the focus control actuator 241 (the position of the focus lens 240 is displaced by vibration). When the interchangeable-lens supply power is from about 1300 mW to about 2000 mW, an amount of power that makes it possible to hold the current position of the focus lens 240 (position holding power) is distributed to the focus control actuator 241. When the interchangeable-lens supply power is from about 2000 mW to about 4000 mW, power that increases with an increase in interchangeable-lens supply power (the increase is from the position holding power to the maximum power consumption) is distributed to the focus control actuator 241. It should be noted that when the power distributed to the focus control actuator 241 becomes larger than the position holding power, the focus control actuator 241 becomes able to move the focus lens 240.

When the interchangeable-lens supply power is larger than about 4000 mW, the power distributed to the focus control actuator 241 becomes the maximum power consumption (100%). It should be noted that when the interchangeable-lens supply power is from about 2000 mW to about 4000 mW, the driving force generated by the focus control actuator 241 becomes larger as the distributed power increases.

The camera shake correction drive power characteristic 332 is a characteristic indicating the power distributed to the camera shake correction actuator 221 during the monitoring operation. In accordance with the camera shake correction drive power characteristic 332, when the interchangeable-lens supply power is smaller than about 1000 mW, no power is distributed to the camera shake correction actuator 221 (the position of the camera shake correction lens 220 is displaced by vibration). When the interchangeable-lens supply power is from about 1000 mW to about 2400 mW, an amount of power that makes it possible to hold the current position of the camera shake correction lens 220 (position holding power) is distributed to the camera shake correction actuator 221. When the interchangeable-lens supply power is from about 2400 mW to about 4400 mW, power that increases with an increase in interchangeable-lens supply power (the increase is from the position holding power to the maximum power consumption) is distributed to the camera shake correction actuator 221. When the interchangeable-lens supply power is larger than about 4400 mW, the power distributed to the camera shake correction actuator 221 becomes the maximum power consumption (100%).

The diaphragm drive power characteristic 333 is a characteristic indicating the power distributed to the diaphragm drive actuator 231 during the monitoring operation. In accordance with the diaphragm drive power characteristic 333, when the interchangeable-lens supply power is smaller than about 1750 mW, no power is distributed to the diaphragm drive actuator 231 (the position of the diaphragm 230 is displaced by vibration). When the interchangeable-lens supply power is from about 1750 mW to about 2750 mW, an amount of power that makes it possible to hold the current position of the diaphragm 230 (position holding power) is distributed to the diaphragm drive actuator 231. When the interchangeable-lens supply power is from about 2750 mW to about 4500 mW, power that increases with an increase in interchangeable-lens supply power (the increase is from the position holding power to the maximum power consumption) is distributed to the diaphragm drive actuator 231. When the interchangeable-lens supply power is larger than about 4500 mW, the power distributed to the diaphragm drive actuator 231 becomes the maximum power consumption (100%).

Now, a description will be given of the power distribution table used during the monitoring operation, while focusing on two regions (a distribution priority region A1 and a distribution priority region A2) in this power distribution table.

The distribution priority region A1 is a region indicating distribution of power in the case when the amount of power received by the interchangeable lens 200 from the imaging apparatus 100 (interchangeable-lens supply power) is not large enough to supply position holding power to all of the actuators in the interchangeable lens 200 (about 2000 mW). During the monitoring operation, the composition of a captured image is determined by the user. During this operation, when the center of the camera shake correction lens 220 is not aligned with the optical axis, it is not possible to determine the composition of the captured image due to displacement of the field of view. Accordingly, in the distribution priority region A1, power is distributed most preferentially to the camera shake correction actuator 221 so that the position holding power is supplied to the camera shake correction actuator 221 to align the center of the camera shake correction lens 220 with the optical axis. That is, when the interchangeable-lens supply power is smaller than a predetermined amount of power (for example, about 2000 mW), distribution of power to the camera shake correction actuator 221 is given a higher priority than distribution of power to the focus control actuator 241.

Even when the position holding power is being supplied to the camera shake correction actuator 221, if focus is displaced frequently due to vibration, the composition of a captured image is not readily determined. Accordingly, when an amount of power more than enough to distribute the position holding power to the camera shake correction actuator 221 is supplied to the interchangeable lens 200, power is distributed in such a preferential manner that the position holding power is distributed to the focus control actuator 241. It should be noted that when an amount of power more than enough to distribute the position holding power to each of the camera shake correction actuator 221 and the focus control actuator 241 is supplied to the interchangeable lens 200, power is distributed in such a preferential manner that the position holding power is supplied to the diaphragm drive actuator 231. That is, when the interchangeable-lens supply power is larger than a predetermined amount of power, distribution of power to the diaphragm drive actuator 231 is given a higher priority than distribution of power to the camera shake correction actuator 221 and the focus control actuator 241.

In this way, in the distribution priority region A1, as the order of priority (priority level) in which to distribute power, the camera shake correction actuator 221 is given the highest priority, the focus control actuator 241 is given the next highest priority, and the diaphragm drive actuator 231 is given the lowest priority. Thus, when supply power is small during the monitoring operation (when generating a live view image), objects to be driven by the individual actuators are held into position in order from the one that affects the monitoring operation the most.

The distribution priority region A2 is a region indicating the order of priority in the case when the interchangeable lens 200 receives an amount of power larger than the amount of power (about 2000 mW) large enough to supply the position holding power to all of the actuators. As the amount of power larger than the position holding power is distributed, each of the actuators becomes able to move the corresponding lens or diaphragm. When the user is to determine the composition of a captured image during the monitoring operation, if focus is quickly aligned with the object to be shot, the user can readily determine the composition. Moreover, in this case, even if the live view image becomes blurred due to camera shake, the user is able to determine the composition of the captured image in the same way as in the case of a camera with no camera shake correction. That is, when the user is to determine the composition of a captured image during the monitoring operation, it is more important to quickly bring focus into alignment with the object to be shot, than to display a blur-free live view by correcting camera shake.

Moreover, even if the diaphragm 230 has not been set to the opening that allows exposure when capturing a live view image, by adjusting the exposure time in the imaging device, for example, the imaging apparatus 100 can generate a live view image with an image quality sufficient to determine the composition of the captured image. That is, in the distribution priority region A2, power is distributed preferentially to the focus control actuator 241 so that focus is quickly aligned. In the case when an amount of power large enough to adjust focus at somewhat high speed is supplied to the interchangeable lens 200, the user becomes able to determine the composition more easily, so power is distributed also to the camera shake correction actuator 221. In the case when an amount of power large enough to adjust focus at somewhat high speed and also correct camera shake in a satisfactory manner is supplied to the interchangeable lens 200, to bring the composition closer to the composition of the captured image, power is distributed to the diaphragm drive actuator 231 so that the diaphragm 230 can be driven.

In this way, in the distribution priority region A2, as the order of priority (priority level) in which to distribute power, the focus control actuator 241 is given the highest priority, the camera shake correction actuator 221 is given the next highest priority, and the diaphragm drive actuator 231 is given the lowest priority. Thus, even when an amount of power not large enough to drive all of the actuators in a satisfactory manner (i.e., resulting in slower rotation) is supplied to the interchangeable lens 200, power can be distributed to each individual actuator in such a way that allows the user to readily determine the composition of the captured image.

[Example of Power Distribution Table Used During Charge Operation]

Figure 4:
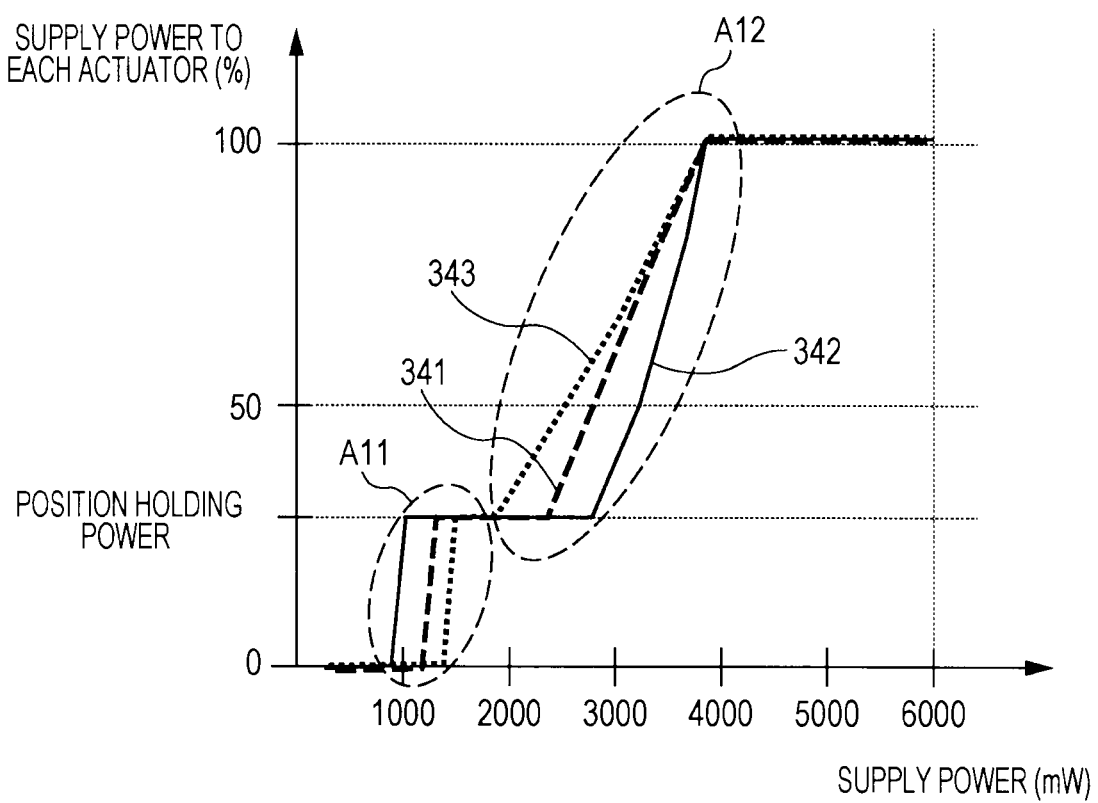
FIG. 4 is a graph showing an example of a power distribution table used during a charge operation which is held by the distribution table holding section according to an embodiment of the present invention.

FIG. 4 is a graph showing an example of a power distribution table used during the charge operation which is held by the distribution table holding section 250 according to an embodiment of the present invention.

FIG. 4 shows power characteristics indicating the distribution of powers supplied to individual actuators during the charge operation (see FIGS. 2A and 2B), with the horizontal axis taken as an axis indicating the interchangeable-lens supply power, and the vertical axis taken as an axis indicating the powers supplied to the individual actuators in the interchangeable lens 200. FIG. 4 shows a focus drive power characteristic 341, a camera shake correction drive power characteristic 342, and a diaphragm drive power characteristic 343, as the power characteristics indicating the distribution of powers supplied to the individual actuators.

It should be noted that for the individual characteristics shown in FIG. 4, the characteristics up to when the supply power exceeds about 2000 mW are substantially the same as those during the monitoring operation shown in FIG. 3, and thus description thereof is omitted here.

The focus drive power characteristic 341 is a characteristic indicating the power distributed to the focus control actuator 241 during the charge operation. In accordance with the focus drive power characteristic 341, when the interchangeable-lens supply power is from about 2400 mW to about 3800 mW, power that increases with an increase in interchangeable-lens supply power (the increase is from the position holding power to the maximum power consumption) is distributed to the focus control actuator 241. When the interchangeable-lens supply power is larger than about 3800 mW, the power distributed to the focus control actuator 241 becomes the maximum power consumption (100%).

The camera shake correction drive power characteristic 342 is a characteristic indicating the power distributed to the camera shake correction actuator 221 during the charge operation. In accordance with the camera shake correction drive power characteristic 342, when the interchangeable-lens supply power is from about 2800 mW to about 3800 mW, power that increases with an increase in interchangeable-lens supply power (the increase is from the position holding power to the maximum power consumption) is distributed to the camera shake correction actuator 221. When the interchangeable-lens supply power is larger than about 3800 mW, the power distributed to the camera shake correction actuator 221 becomes the maximum power consumption (100%).

The diaphragm drive power characteristic 343 is a characteristic indicating the power distributed to the diaphragm drive actuator 231 during the charge operation. In accordance with the diaphragm drive power characteristic 343, when the interchangeable-lens supply power is from about 2000 mW to about 3800 mW, power that increases with an increase in interchangeable-lens supply power (the increase is from the position holding power to the maximum power consumption) is distributed to the diaphragm drive actuator 231. When the interchangeable-lens supply power is larger than about 3800 mW, the power distributed to the diaphragm drive actuator 231 becomes the maximum power consumption (100%).

Now, a description will be given of the power distribution table used during the charge operation, while focusing on the region (distribution priority region A12) corresponding to the distribution priority region A2 shown in FIG. 3.

The charge operation represents a preparatory period until exposure starts, and thus it is necessary for adjustment of the focus and diaphragm to be completed by the time exposure starts. Also, since the charge operation corresponds to the timing from immediately after the user determines the composition of a captured image and depresses the shutter button to the exposure, it is unnecessary to generate a live view with little blur. That is, in the distribution priority region A12, power is distributed preferentially to the focus control actuator 241 and the diaphragm drive actuator 231 so that adjustment of the focus and diaphragm is completed quickly. In the case when an amount of power more than enough to drive the focus control actuator 241 and the diaphragm drive actuator 231 sufficiently quickly is supplied to the interchangeable lens 200, power is also distributed to the camera shake correction actuator 221.

In this way, in the distribution priority region A12, during the charge operation, as the order of priority (priority level) in which to distribute power, the focus control actuator 241 and the diaphragm drive actuator 231 are given a high priority, and the camera shake correction actuator 221 is given the lowest priority. Thus, even when an amount of power not large enough to drive all of the actuators in a satisfactory manner is supplied to the interchangeable lens 200, power can be efficiently distributed to each individual actuator so that adjustment of the focus and diaphragm is performed quickly during the charge operation.

[Example of Power Distribution Table Used During Still Image Exposure Operation]

Figure 5:
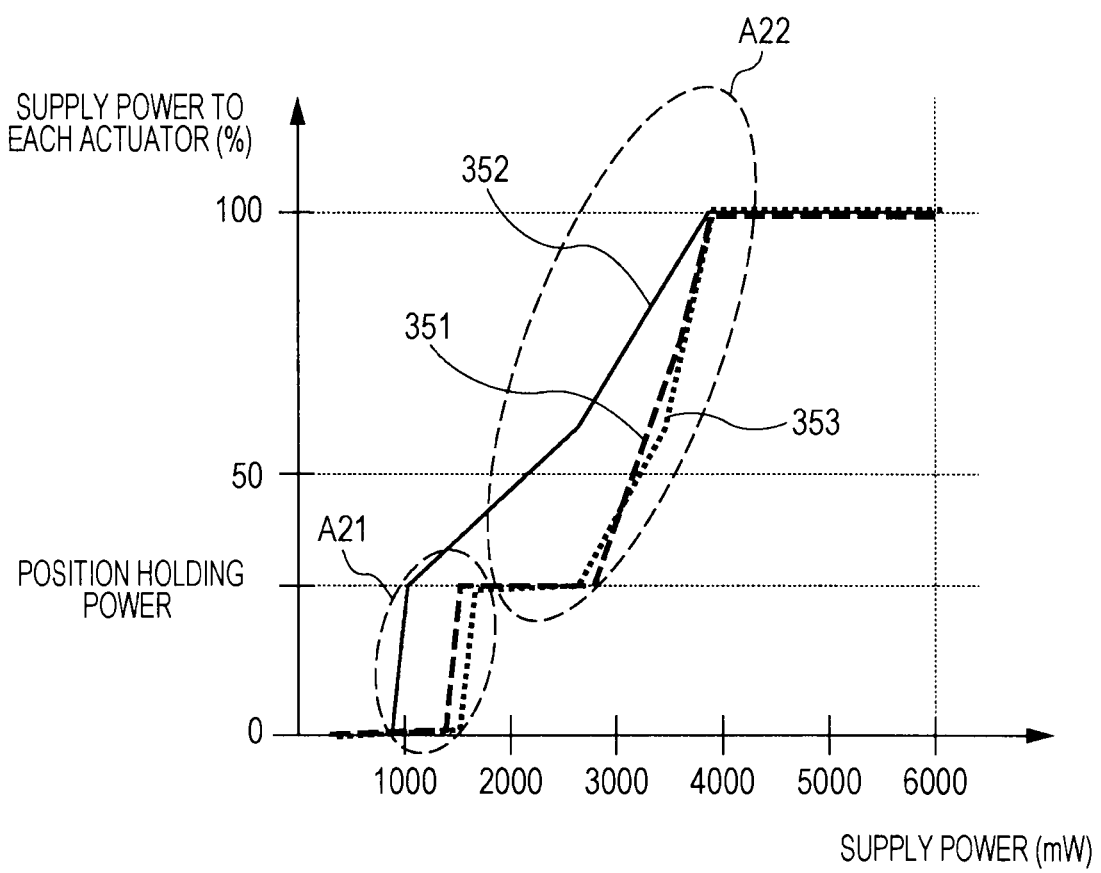
FIG. 5 is a graph showing an example of a power distribution table used during a still image exposure operation which is held by the distribution table holding section according to an embodiment of the present invention.

FIG. 5 is a graph showing an example of a power distribution table used during a still image exposure operation which is held by the distribution table holding section 250 according to an embodiment of the present invention.

FIG. 5 shows power characteristics indicating the distribution of powers supplied to individual actuators during the exposure operation for a still image (see FIGS. 2A and 2B), with the horizontal axis taken as an axis indicating the interchangeable-lens supply power, and the vertical axis taken as an axis indicating the powers supplied to the individual actuators in the interchangeable lens 200. FIG. 5 shows a focus drive power characteristic 351, a camera shake correction drive power characteristic 352, and a diaphragm drive power characteristic 353, as the power characteristics indicating the distribution of powers supplied to the individual actuators.

The focus drive power characteristic 351 is a characteristic indicating the power distributed to the focus control actuator 241 during the still image exposure operation. In accordance with the focus drive power characteristic 351, when the interchangeable-lens supply power is smaller than about 1500 mW, no power is distributed to the focus control actuator 241. When the interchangeable-lens supply power is from about 1500 mW to about 2500 mW, an amount of power equivalent to the position holding power is distributed to the focus control actuator 241. When the interchangeable-lens supply power is from about 2500 mW to about 3800 mW, power that increases with an increase in interchangeable-lens supply power (the increase is from the position holding power to the maximum power consumption) is distributed to the focus control actuator 241.

The camera shake correction drive power characteristic 352 is a characteristic indicating the power distributed to the camera shake correction actuator 221 during the still image exposure operation. In accordance with the camera shake correction drive power characteristic 352, when the interchangeable-lens supply power is smaller than about 1000 mW, no power is distributed to the camera shake correction actuator 221. When the interchangeable-lens supply power is from about 1000 mW to about 3800 mW, power that increases with an increase in interchangeable-lens supply power (the increase is from the position holding power to the maximum power consumption) is distributed to the camera shake correction actuator 221.

The diaphragm drive power characteristic 353 is a characteristic indicating the power distributed to the diaphragm drive actuator 231 during the still image exposure operation. Since the diaphragm drive power characteristic 353 is substantially the same as the focus drive power characteristic 351, description thereof is omitted here.

Now, a description will be given of the power distribution table used during the still image exposure operation, while focusing on two regions (a distribution priority region A21 and a distribution priority region A22) in this power distribution table.

The distribution priority region A21 is a region corresponding to each of the distribution priority regions A1 and A11 respectively shown in FIGS. 3 and 4. Also, the distribution priority region A22 is a region corresponding to each of the distribution priority regions A2 and A12 respectively shown in FIGS. 3 and 4. During the still image exposure operation, the imaging device in the imaging section 181 is being exposed to incident light from a subject in order to generate a captured image. Blur occurs if camera shake occurs in this state. Also, hardly any drive of the focus and diaphragm takes place unless some special image capture is performed. Further, in the case when no power is distributed to the corresponding actuators, the focus and diaphragm do not move unless vibration is applied to the interchangeable lens 200. Accordingly, in the distribution priority region A21 and the distribution priority region A22, power is distributed most preferentially to the camera shake correction actuator 221.

In the distribution priority region A21, a higher priority is given to distributing an amount of power larger than the position holding power to the camera shake correction actuator 221, than to distributing the position holding power to each of the focus control actuator 241 and the diaphragm drive actuator 231. In the case when the amount of power distributed preferentially to the camera shake correction actuator 221 is large enough to correct camera shake of a certain magnitude (predetermined magnitude), power is distributed in such a way that the power distributed to each of the other actuators becomes equal to the position holding power.

In the distribution priority region A22, when the interchangeable-lens supply power is more than enough to distribute sufficient power to the camera shake correction actuator 221, an amount of power larger than the position holding power is distributed to each of the focus control actuator 241 and the diaphragm drive actuator 231.

In this way, during the still image exposure operation, as the order of priority in which to distribute power, the camera shake correction actuator 221 is given the highest priority. Thus, even when an amount of power not large enough to drive all of the actuators in a satisfactory manner is supplied to the interchangeable lens 200, power can be efficiently distributed to each individual actuator so that no blur occurs in the capture image during the still image exposure operation.

[Example of Power Distribution Table Used During Moving Image Exposure Operation]

Figure 6:
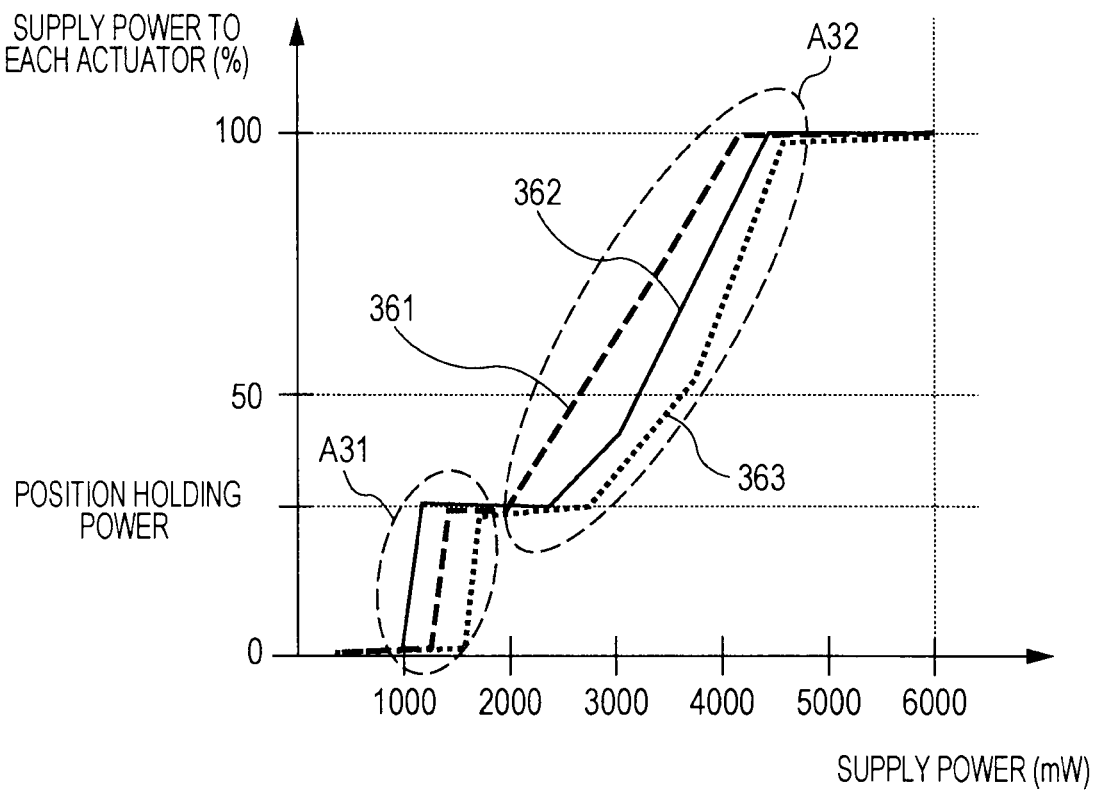
FIG. 6 is a graph showing an example of a power distribution table used during a moving image exposure operation which is held by the distribution table holding section according to an embodiment of the present invention.

FIG. 6 is a graph showing an example of a power distribution table used during a moving image exposure operation which is held by the distribution table holding section 250 according to an embodiment of the present invention. Since the power distribution table used during this moving image exposure operation is substantially the same as the power distribution table used during the monitoring operation shown in FIG. 3, detailed description thereof is omitted here. It should be noted that FIG. 6 shows power characteristics 361 to 363 and distribution priority regions A31 and A32 respectively corresponding to the power characteristics and the distribution priority regions shown in FIG. 3.

During the moving image exposure operation, the imaging device in the imaging section 181 is receiving light and successively generating captured images, and thus it is important to align focus with an object to be captured at all times. When the drive of the focus lens 240 is slow during this moving image exposure operation, focus is not aligned with an object (in particular, a moving body) to be captured, and thus there is a possibility that moving images made up of only out-of-focus images may be generated. Also, during this moving image exposure operation, blur caused by camera shake affects the captured image. It should be noted that in the case where an image is blurred due to focus blur, the blur is not corrected even when the camera shake is corrected, so drive of the focus lens 240 is given a higher priority than drive of the camera shake correction lens 220.

For this reason, during the moving image exposure operation, the distribution of power is determined in accordance with the same order of priority given to each individual operation as that during the monitoring operation.

In this way, by holding a plurality of power distribution tables according to the operation of the imaging apparatus 100 by the distribution table holding section 250, the interchangeable lens 200 can distribute power to each individual actuator efficiently.

It should be noted that the power distribution tables shown in FIGS. 3 to 6 are an example. Since the amount and efficiency of power consumption varies depending on the actuator, the power distribution tables vary for each individual interchangeable lens 200. For example, a stepping motor consumes less power than a DC motor, and an ultrasonic motor consumes more power than a DC motor. Also, even among actuators of the same kind, a large-sized actuator with large power consumption is equipped when the object to be driven is large, and a small-sized actuator with small power consumption is equipped when the object to be driven is small. Also, among actuators of the same kind, there are efficient actuators that provide large driving force relative to the power consumption, actuators that provide poor efficiency but high accuracy of drive, and the like. Even in the case where the actuators equipped to the interchangeable lens 200 vary for each individual interchangeable lens, power is distributed in accordance with the order of priority given to each operation shown in FIGS. 3 to 6, thereby making it possible to efficiently distribute power to each individual actuator.

While the above description of FIGS. 3 to 6 assumes a case in which all of the actuators in the interchangeable lens 200 are driven simultaneously, this should not be construed restrictively. For example, assume a case in which 4000 mW of power is supplied to the interchangeable lens 200, and only the focus lens 240 and the camera shake correction lens 220 are to be driven. In this case, for example, it is conceivable to use such a power distribution table that only the position holding power is supplied to the diaphragm drive actuator 231, and the remainder of power is distributed between the focus control actuator 241 and the camera shake correction actuator 221.

While the above description of FIGS. 3 to 6 is directed to a case in which the distribution table holding section 250 holds a plurality of power distribution tables, this should not be construed restrictively. For example, the distribution table holding section 250 may hold a single power distribution table, and determine the distribution of power on the basis of the single power distribution table and the amount of interchangeable-lens supply power. Alternatively, the distribution table holding section 250 may hold the degrees of distribution according to a plurality of operation modes (fixed value for each individual operation mode), and a fixed amount of power supplied to the interchangeable lens 200 may be distributed in accordance with the operation mode.

[Example of Operation of Imaging System]

Next, the operation of the imaging system 10 according to an embodiment of the present invention will be described with reference to the drawings.

Figure 7:
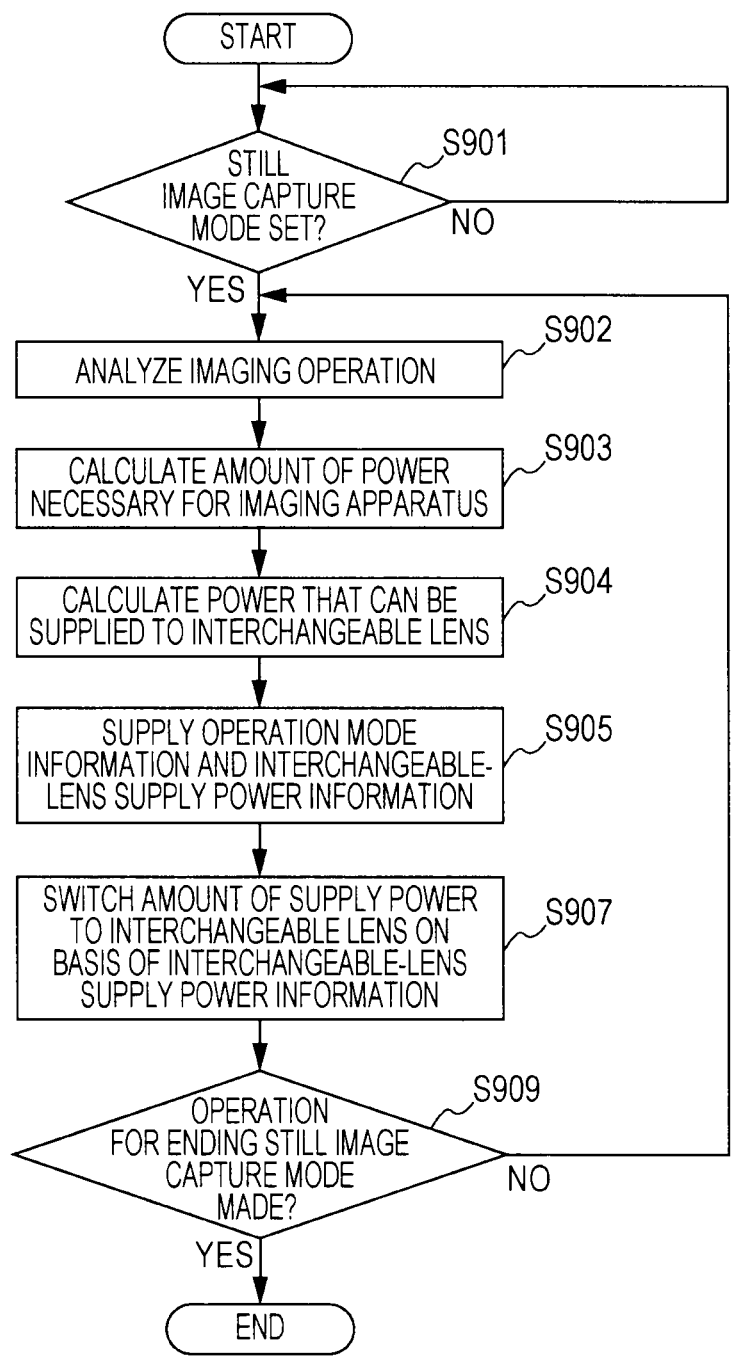
FIG. 7 is a flowchart showing an example of a supply power switching process when capturing a still image which is performed by an imaging apparatus according to an embodiment of the present invention.

FIG. 7 is a flowchart showing an example of a supply power switching process when capturing a still image which is performed by the imaging apparatus 100 according to an embodiment of the present invention. FIG. 7 shows an example of a procedure from when the user executes an operation of selecting the mode for capturing a still image, to when the mode is ended.

First, it is judged by the control section 120 whether or not the mode for capturing a still image (still image capture mode) has been set (step S901). Then, if it is judged that the still image capture mode has not been set (step S901), the processing returns to step S901 to wait on standby until the still image capture mode is set.

On the other hand, if it is judged that the still image capture mode has been set (step S901), operation of the imaging apparatus 100 is analyzed by the control section 120 (step S902). Then, on the basis of the analysis results, the power necessary for the imaging apparatus 100 is calculated by the control section 120 (step S903). Subsequently, on the basis of the calculated power, the power that can be supplied to the interchangeable lens 200 is calculated by the interchangeable-lens supply power determining section 140 (step S904).

Then, on the basis of the analysis results on the operation of the imaging apparatus 100 and the power that can be supplied to the interchangeable lens 200, operation mode information and interchangeable-lens supply power information are supplied by the main body operation information supply section 130 and the interchangeable-lens supply power determining section 140 (step S905). Subsequently, on the basis of the interchangeable-lens supply power information, the power supplied to the interchangeable lens 200 (lens supply power) is switched by the interchangeable-lens power supply section 150 (step S907).

Thereafter, it is judged by the control section 120 whether or not an operation for ending the still image capture mode has been made (step S909). Then, if it is judged that an operation for ending the still image capture mode has not been made (step S909), the processing returns to step S902.

On the other hand, if it is judged that an operation for ending the still image capture mode has been made (step S909), the supply power switching process when capturing a still image is ended.

Figure 8:
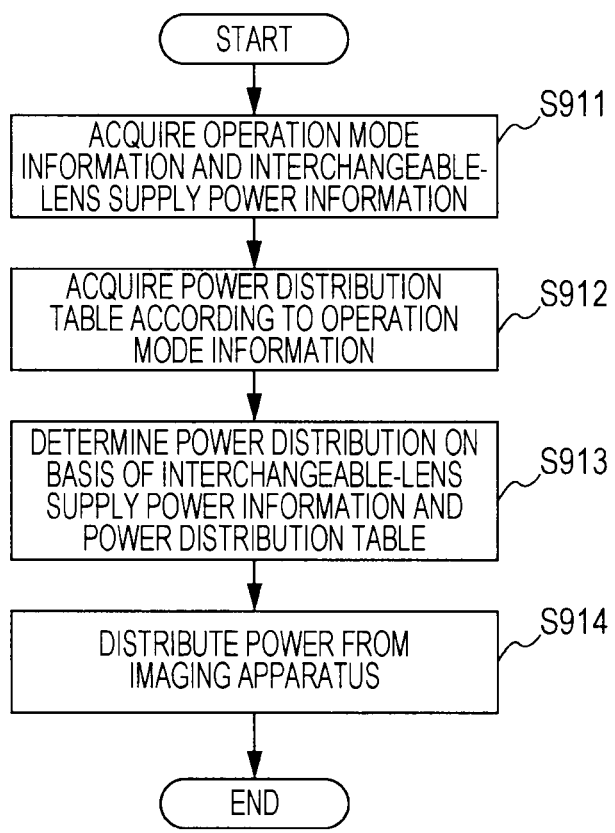
FIG. 8 is a flowchart showing an example of a power distribution process when capturing a still image which is performed by an interchangeable lens according to an embodiment of the present invention.

FIG. 8 is a flowchart showing an example of a power distribution process when capturing a still image which is performed by the interchangeable lens 200 according to an embodiment of the present invention. FIG. 8 shows an example of a distribution procedure from when the interchangeable lens 200 acquires operation mode information and interchangeable-lens supply power information from the imaging apparatus 100, to when power is distributed on the basis of the acquired information.

First, operation mode information and interchangeable-lens supply power information are acquired by the distributed power determining section 260 (step S911). Then, on the basis of the acquired operation mode information, a power distribution table is acquired by the distributed power determining section 260 (step S912). It should be noted that step S911 is an example of the step of acquiring described in the claims.

Then, on the basis of the acquired power distribution table and interchangeable-lens supply power information, the distribution of power to be supplied to the individual actuators is determined by the distributed power determining section 260 (step S913). Subsequently, on the basis of the determined distribution, the power supplied from the imaging apparatus 100 is distributed (step S914). Then, the distribution procedure by the interchangeable lens 200 ends. It should be noted that step S913 is an example of the step of determining described in the claims.

In this way, in an embodiment of the present invention, the degree of priority given to the operation of each individual actuator is determined on the basis of the operation mode and the power supplied to the interchangeable lens, thereby allowing the actuators to be driven efficiently in accordance with how much power has been supplied.

Now, an example of how a lens is driven efficiently according to an embodiment of the present invention will be described, while making comparison with the operation of actuators during image capture according to the related art.

In the case of a lens-integrated imaging apparatus (compact digital camera) according to the related art, generally, a plurality of actuators in a lens are driven exclusively to prevent the power consumed by the actuators from exceeding the power supplied to the lens. For example, to move a focus lens and a diaphragm, first, all of the power is supplied to an actuator that drives the focus lens to thereby drive the focus lens to a target position (the diaphragm does not move). Then, once the focus lens moves to the target position, all of the power is supplied to an actuator that drives the diaphragm to thereby set the diaphragm to a target opening (the focus lens does not move).

Since this exclusive control is performed irrespective of how much power is supplied to the lens, in situations such as where an amount of power large enough to move both the actuators is supplied to the lens, there is a fear that unnecessary time may be wasted.

When an embodiment of the present invention is applied to such a compact digital camera, power is simultaneously distributed to the plurality of actuators on the basis of their degrees of priority that vary with the operating state of the compact digital camera. This makes it possible to simultaneously drive the plurality of actuators with the corresponding driving forces.

In the case of a digital single-lens reflect camera whose lens unit (interchangeable lens) is interchangeable according to the related art, in order to adapt to interchangeable lenses with varying power consumption, a large amount of power is supplied to the interchangeable lens at all times. This makes it possible to simultaneously drive a plurality of actuators in the interchangeable lens with the maximum power consumption.

This drive method makes it necessary to make the size of the power source in the imaging apparatus large in order to secure a large amount of power for the interchangeable lens at all times. This prevents miniaturization of the power source when producing a compact camera body.

When an embodiment of the present invention is applied to such a digital single-lens reflex camera, the plurality of actuators can be efficiently driven simultaneously, even in the case where the amount of power supplied to the interchangeable lens is small due to miniaturization of the power source.

It should be noted that the embodiments of the present invention are illustrative of an example for implementing the present invention, and as explicitly stated in the embodiments of the present invention, there is a mutual correspondence between matters described in the embodiments of the present invention, and invention-defining matters described in the claims. Likewise, there is a mutual correspondence between invention-defining matters described in the claims, and matters described in the embodiments of the present invention which are denoted by the same names as those of the invention-defining matters. It should be noted, however, that the present invention is not limited to the embodiments, and the present invention can be implemented by making various modifications to the embodiments without departing from the scope of the present invention.

The processing steps described with reference to the embodiments of the present invention may be grasped as a method having a series of these steps, or may be grasped as a program for causing a computer to execute a series of these steps or a recording medium that stores the program. As this recording medium, for example, a compact disc (CD), a Mini-Disc (MD), a digital versatile disk (DVD), a memory card, a Blur-ray Disc (registered trademark), or the like can be used.

The present application contains subject matter related to that disclosed in Japanese Priority Patent Application JP 2010-122233 filed in the Japan Patent Office on May 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An interchangeable lens comprising:
a plurality of optical members including a focus lens and a correction lens for correcting camera shake;
a plurality of driving sections including a first driving section that drives the focus lens and a second driving section that drives the correction lens; and
a computer configured to:
acquire operation information related to an operation of an imaging apparatus in a period during which the supply power is supplied from the imaging apparatus to which the interchangeable lens is attached; and
determine power to be distributed to the plurality of driving sections that drive the plurality of optical members, for each of the driving sections, on the basis of the acquired amount of supply power and the acquired operation information,
wherein the computer determines which of the first driving section or the second driving section to prioritize in distribution of the power based on the operation information, and
wherein the computer gives the second driving section a lower priority in distribution of power than the first driving section, when the operation of the imaging apparatus specified by the acquired operation information is an operation in a period from when a shutter button is depressed to when exposure starts.

2. The interchangeable lens according to claim 1,
wherein when the optical members are to be driven, the computer determines power to be distributed to each of the driving sections that drives each of the optical members.

3. The interchangeable lens according to claim 1, further comprising: a holding section that holds power distribution information in association with the operation information, the power distribution information indicating a relationship between the amount of supply power and power used by each of the driving sections,
wherein the computer acquires the power distribution information corresponding to the operation information from the holding section, and determines the power to be distributed, on the basis of the acquired power distribution information and the amount of supply power.

4. The interchangeable lens according to claim 1,
wherein the computer gives the first driving section a higher priority in distribution of power than the second driving section, when the operation of the imaging apparatus specified by the acquired operation information is a monitoring operation.

5. The interchangeable lens according to claim 1, wherein:
the plurality of optical members further includes a diaphragm;
the plurality of the driving sections further includes a third driving section that drives the diaphragm; and the computer gives the third driving section a lower priority in distribution of power than the second driving section, when the operation of the imaging apparatus specified by the acquired operation information is a monitoring operation.

6. The interchangeable lens according to claim 1, wherein the computer gives the second driving section a higher priority in distribution of power than the first driving section, when the operation of the imaging apparatus specified by the acquired operation information is an exposure operation when capturing a still image.

7. The interchangeable lens according to claim 1, wherein the computer gives the second driving section a higher priority in distribution of power than the first driving section, when the supply power is smaller than a predetermined amount of power.

8. The interchangeable lens according to claim 1, wherein the computer is configured to acquire an amount of supply power from the imaging apparatus.

9. A method of controlling an interchangeable lens, comprising the steps of:
acquiring operation information related to an operation of an imaging apparatus in a period during which the supply power is supplied from the imaging apparatus to which the interchangeable lens is attached; and
determining, by a computer, power to be distributed to a plurality of driving sections that drive a plurality of optical members, for each of the driving sections, on the basis of the acquired amount of supply power and the acquired operation information, wherein
the plurality of optical members include a focus lens and a correction lens for correcting camera shake,
the plurality of driving sections includes a first driving section that drives the focus lens and a second driving section that drives the correction lens,
the determining includes determining which of the first driving section or the second driving section to prioritize in distribution of the power based on the operation information, and
the determining includes giving the second driving section a lower priority in distribution of power than the first driving section, when the operation of the imaging apparatus specified by the acquired operation information is an operation in a period from when a shutter button is depressed to when exposure starts.

10. The method according to claim 9,
wherein the determining includes giving the second driving section a higher priority in distribution of power than the first driving section, when the operation of the imaging apparatus specified by the acquired operation information is an exposure operation when capturing a still image.

11. A non-transitory computer readable medium including executable instructions, which when executed by a computer cause the computer to execute a method of controlling an interchangeable lens, the method comprising:

acquiring operation information related to an operation of an imaging apparatus in a period during which the supply power is supplied from the imaging apparatus to which the interchangeable lens is attached; and determining power to be distributed to a plurality of driving sections that drive a plurality of optical members, for each of the driving sections, on the basis of the acquired amount of supply power and the acquired operation information, wherein the plurality of optical members include a focus lens and a correction lens for correcting camera shake, the plurality of driving sections includes a first driving section that drives the focus lens and a second driving section that drives the correction lens, and the determining includes determining which of the first driving section or the second driving section to prioritize in distribution of the power based on the operation information, and the determining includes giving the second driving section a lower priority in distribution of power than the first driving section, when the operation of the imaging apparatus specified by the acquired operation information is an operation in a period from when a shutter button is depressed to when exposure starts.

12. The non-transitory computer readable medium according to claim 11, wherein the determining includes giving the second driving section a higher priority in distribution of power than the first driving section, when the operation of the imaging apparatus specified by the acquired operation information is an exposure operation when capturing a still image.

13. An imaging system comprising:
an imaging apparatus; and
an interchangeable lens, wherein the imaging apparatus includes:
an operation information transmitting section that transmits operation information related to an operation of the imaging apparatus to the interchangeable lens being attached, and
the interchangeable lens includes:
a plurality of optical members including a focus lens and a correction lens for correcting camera shake;
a plurality of driving sections including a first driving section that drives the focus lens and a second driving section that drives the correction lens; and
a computer configured to:
acquire the transmitted operation information, and
determine power to be distributed to the plurality of driving sections that drive the plurality of optical members, for each of the driving sections, on the basis of the acquired operation information,
wherein the computer determines which of the first driving section or the second driving section to prioritize in distribution of the power based on the operation information, and
wherein the computer gives the second driving section a lower priority in distribution of power than the first driving section, when the operation of the imaging apparatus specified by the acquired operation information is an operation in a period from when a shutter button is depressed to when exposure starts.

14. The imaging system according to claim 13, wherein the computer gives the second driving section a higher priority in distribution of power than the first driving section, when the operation of the imaging apparatus specified by the acquired operation information is an exposure operation when capturing a still image.

15. The imaging system according to claim 13, wherein the computer is further configured to:
determine an amount of supply power supplied to the interchangeable lens on the basis of power supplied from a power source and power consumption of the imaging apparatus.

16. The imaging system according to claim 13, wherein the computer gives the second driving section a higher priority in distribution of power than the first driving section, when the operation of the imaging apparatus specified by the acquired operation information is an exposure operation when capturing a still image.

17. An interchangeable lens comprising:
a plurality of optical members including a focus lens and a correction lens for correcting camera shake;
a plurality of driving sections including a first driving section that drives the focus lens and a second driving section that drives the correction lens; and
a computer configured to:
acquire operation information related to an operation of an imaging apparatus in a period during which the supply power is supplied from the imaging apparatus to which the interchangeable lens is attached; and
determine power to be distributed to the plurality of driving sections that drive the plurality of optical members, for each of the driving sections, on the basis of the acquired amount of supply power and the acquired operation information,
wherein the computer determines which of the first driving section or the second driving section to prioritize in distribution of the power based on the operation information, and
wherein the computer gives the second driving section a higher priority in distribution of power than the first driving section, when the operation of the imaging apparatus specified by the acquired operation information is an exposure operation when capturing a still image.

18. A method of controlling an interchangeable lens, comprising the steps of:
acquiring operation information related to an operation of an imaging apparatus in a period during which the supply power is supplied from the imaging apparatus to which the interchangeable lens is attached; and
determining, by a computer, power to be distributed to a plurality of driving sections that drive a plurality of optical members, for each of the driving sections, on the basis of the acquired amount of supply power and the acquired operation information, wherein
the plurality of optical members include a focus lens and a correction lens for correcting camera shake,
the plurality of driving sections includes a first driving section that drives the focus lens and a second driving section that drives the correction lens,
the determining includes determining which of the first driving section or the second driving section to prioritize in distribution of the power based on the operation information, and
the determining includes giving the second driving section a higher priority in distribution of power than the first driving section, when the operation of the imaging apparatus specified by the acquired operation information is an exposure operation when capturing a still image.

19. A non-transitory computer readable medium including executable instructions, which when executed by a computer cause the computer to execute a method of controlling an interchangeable lens, the method comprising:
  acquiring operation information related to an operation of an imaging apparatus in a period during which the supply power is supplied from the imaging apparatus to which the interchangeable lens is attached; and
  determining power to be distributed to a plurality of driving sections that drive a plurality of optical members, for each of the driving sections, on the basis of the acquired amount of supply power and the acquired operation information, wherein
  the plurality of optical members include a focus lens and a correction lens for correcting camera shake,
  the plurality of driving sections includes a first driving section that drives the focus lens and a second driving section that drives the correction lens, and
  the determining includes determining which of the first driving section or the second driving section to prioritize in distribution of the power based on the operation information, and
  the determining includes giving the second driving section a higher priority in distribution of power than the first driving section, when the operation of the imaging apparatus specified by the acquired operation information is an exposure operation when capturing a still image.

20. An imaging system comprising:
an imaging apparatus; and
an interchangeable lens, wherein
the imaging apparatus includes:
an operation information transmitting section that transmits operation information related to an operation of the imaging apparatus to the interchangeable lens being attached, and
the interchangeable lens includes:
a plurality of optical members including a focus lens and a correction lens for correcting camera shake;
a plurality of driving sections including a first driving section that drives the focus lens and a second driving section that drives the correction lens; and
a computer configured to:
acquire the transmitted operation information, and
determine power to be distributed to the plurality of driving sections that drive the plurality of optical members, for each of the driving sections, on the basis of the acquired operation information,
wherein the computer determines which of the first driving section or the second driving section to prioritize in distribution of the power based on the operation information, and
wherein the computer gives the second driving section a higher priority in distribution of power than the first driving section, when the operation of the imaging apparatus specified by the acquired operation information is an exposure operation when capturing a still image.

* * * * *